United States Patent
Hulse

(10) Patent No.: US 7,178,926 B2
(45) Date of Patent: Feb. 20, 2007

(54) ILLUMINATION DEVICE FOR USE IN DAYLIGHT CONDITIONS

(75) Inventor: George R. Hulse, Arlington Heights, IL (US)

(73) Assignee: iLight Technologies, Inc., Chicago, IL (US)

( * ) Notice: Subject to any disclaimer, the term of this patent is extended or adjusted under 35 U.S.C. 154(b) by 0 days.

(21) Appl. No.: 11/456,136

(22) Filed: Jul. 7, 2006

(65) Prior Publication Data

US 2007/0014096 A1 Jan. 18, 2007

Related U.S. Application Data

(60) Provisional application No. 60/698,809, filed on Jul. 13, 2005.

(51) Int. Cl.
*F21S 4/00* (2006.01)
*E01F 9/016* (2006.01)
*G09F 19/22* (2006.01)
*G09F 21/10* (2006.01)

(52) U.S. Cl. .................. 362/2; 362/84; 362/812; 362/555; 362/558; 362/231; 362/326

(58) Field of Classification Search .............. 362/2, 362/555, 558, 559, 560, 293, 260, 812, 84, 362/231, 326; 40/542; 313/477 R, 479, 313/313, 112
See application file for complete search history.

(56) References Cited

U.S. PATENT DOCUMENTS

| 3,027,669 | A | * | 4/1962 | Hardesty ................ 40/546 |
| 7,011,421 | B2 | | 3/2006 | Hulse et al. |
| 2005/0111236 | A1 | | 5/2005 | Hulse |
| 2005/0195603 | A1 | | 9/2005 | Hulse |
| 2006/0198119 | A1 | | 9/2006 | Hulse |

* cited by examiner

*Primary Examiner*—Sandra O'Shea
*Assistant Examiner*—Sharon Payne
(74) *Attorney, Agent, or Firm*—Stites & Harbison, PLLC; David W. Nagle, Jr.

(57) ABSTRACT

An illumination device for use in daylight conditions includes a light-diffusing member provided with one or more dyes and a light source extending along and positioned adjacent a light-receiving surface of the light-diffusing member, with the light source emitting light that is substantially unabsorbed by the dyes as it passes through the light-diffusing member. Accordingly, in daylight conditions, the dyes are activated by sunlight to emit light such that light perceived along a light-emitting surface of the light-diffusing member is a combination of light from said light source and light from the dyes, thus increasing the output of the illumination device in daylight conditions.

22 Claims, 4 Drawing Sheets

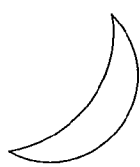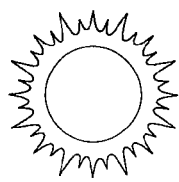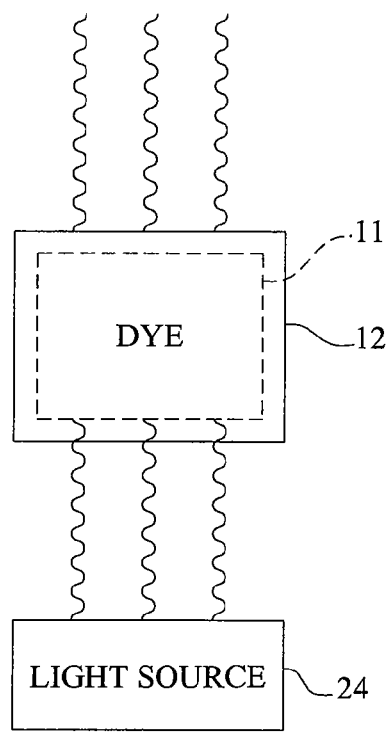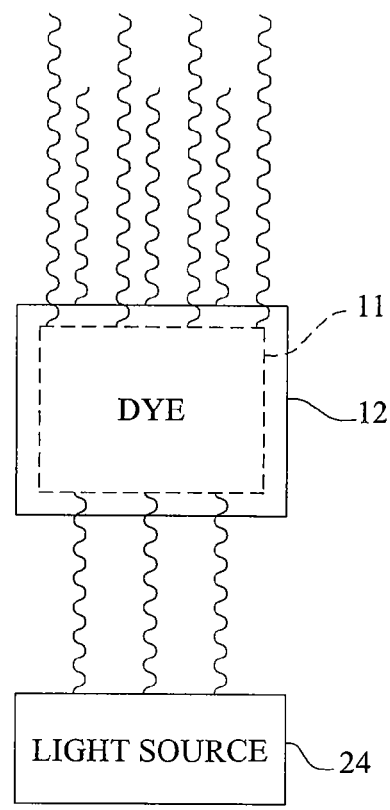
FIG. 1A                FIG. 1B

ILLUMINATION DEVICE FOR USE IN DAYLIGHT CONDITIONS

CROSS-REFERENCE TO RELATED APPLICATIONS

The present application claims priority to U.S. Provisional Patent Application Ser. No. 60/698,809 filed on Jul. 13, 2005, the entire disclosure of which is incorporated herein by reference.

BACKGROUND OF THE INVENTION

The present invention relates to an illumination device for use in daylight conditions, and, more particularly, an illumination device that is an effective simulator of neon lighting.

Neon lighting, which is produced by the electrical stimulation of the electrons in the low-pressure neon gas-filled glass tube, has been a main stay in advertising and for signage. A characteristic of neon lighting is that the tubing encompassing the gas has an even glow over its entire length irrespective of the viewing angle. This characteristic makes neon lighting adaptable for many advertising applications, including script writing and designs, because the glass tubing can be fabricated into curved and twisted configurations simulating script writing and intricate designs. The even glow of neon lighting being typically devoid of hot spots allows for advertising without visual and unsightly distractions. Thus, any illumination device that is developed to duplicate the effects of neon lighting must also have even light distribution over its length and about its circumference. Equally important, such lighting devices must have a brightness that is at least comparable to neon lighting. Further, since neon lighting is a well-established industry, a competitive lighting device must be lightweight and have superior "handleability" characteristics in order to make inroads into the neon lighting market. Neon lighting is recognized as being fragile in nature. Because of the fragility and heavy weight, primarily due to its supporting infrastructure, neon lighting is expensive to package and ship. Moreover, it is extremely awkward to initially handle, install, and/or replace. Any lighting device that can provide those previously enumerated positive characteristics of neon lighting, while minimizing its size, weight, and handleability shortcomings, will provide for a significant advance in the lighting technology.

The recent introduction of lightweight and breakage resistant point light sources, as exemplified by high-intensity light-emitting diodes (LEDs), have shown great promise to those interested in illumination devices that may simulate neon or similar lighting and have stimulated much effort in that direction. However, the twin attributes of neon lighting, uniformity and brightness, have proven to be difficult obstacles to overcome as such attempts to simulate neon lighting have largely been stymied by the tradeoffs between light distribution to promote the uniformity and brightness.

In an attempt to address some of the shortcomings of neon, commonly assigned U.S. Pat. Nos. 6,592,238 and 6,953,262, which are incorporated in their entirety herein by reference, describe an illumination device comprising a profiled rod of material having waveguide properties that preferentially scatters light entering one surface ("light-receiving surface") so that the resulting light intensity pattern emitted by another surface of the rod ("light-emitting surface") is elongated along the length of the rod. A light source extends along and is positioned adjacent the light-receiving surface and spaced from the light-emitting surface a distance sufficient to create an elongated light intensity pattern with a major axis along the length of the rod and a minor axis that has a width that covers substantially the entire circumferential width of the light-emitting surface. In one preferred arrangement, the light source is a string of point light sources spaced a distance apart sufficient to permit the mapping of the light emitted by each point light source into the rod so as to create elongated and overlapping light intensity patterns along the light-emitting surface and circumferentially about the surface so that the collective light intensity pattern is perceived as being uniform over the entire light-emitting surface.

One of the features of the illumination device described and claimed in U.S. Pat. Nos. 6,592,238 and 6,953,262 is the uniformity and intensity of the light emitted by the illumination device. While it is important that the disadvantages of neon lighting be avoided (for example, weight and fragility), an illumination device would have little commercial or practical value if the proper light uniformity and intensity could not be obtained. This objective is achieved primarily through the use of a "leaky" waveguide rod. A "leaky" waveguide is structural member that functions both as an optical waveguide and light scattering member. As a waveguide, it tends to preferentially direct light entering the waveguide, including the light entering a surface thereof, along the axial direction of the waveguide, while as a light scattering member, it urges the light out of an opposite surface of the waveguide. As a result, what is visually perceived is an elongated light pattern being emitted along the light-emitting surface of the waveguide.

Nonetheless, it has been observed that when using such an illumination device in daylight conditions, sunlight may "wash out" the light emitted from light-emitting surface of the device, such that the light may not be visually perceptible. Accordingly, there remains a need for an illumination device with a means for increasing the visibility of light emitted from the device in daylight conditions.

SUMMARY OF THE INVENTION

The present invention is an illumination device that includes a means for increasing the visibility of light emitted from the device in daylight conditions. In general, a light-diffusing member is provided with fluorescent and/or phosphorescent dyes that are mixed in and encapsulated in the material that comprises the light-diffusing member or incorporated into a paint or similar coating applied to one or more surfaces of the light-diffusing member. The dyes absorb light at certain wavelengths and then emit light of a lesser energy at longer wavelengths. A light source, such as a plurality of light-emitting diodes spaced a predetermined distance from one another, emits light into the light-diffusing member. The dye (or combination of dyes) is selected based on its emission profile and also so that light from the light source is largely unabsorbed by the dyes and passes through the light-diffusing member. Alternatively, assuming that the dye has been selected for a particular application, a light source is chosen based on its color (wavelength) and such that its emitted light will be largely unabsorbed by the dye and pass through the light-diffusing member.

Although light from the light source will be largely unabsorbed by the dye and pass through the light-diffusing member, when sunlight strikes the light-diffusing member, there will be significant interaction with and activation of the dye as sunlight is absorbed by the dye. Accordingly, during daylight conditions, the light source emits light through the light-diffusing member, while at the same time, sunlight activates the dyes of the light-diffusing member to cause them to emit additional light.

DESCRIPTION OF THE DRAWINGS

FIGS. 1a and 1b are block diagrams that generally illustrate the function of an illumination device made in accordance with the present invention;

DETAILED DESCRIPTION OF THE INVENTION

Figure 2:
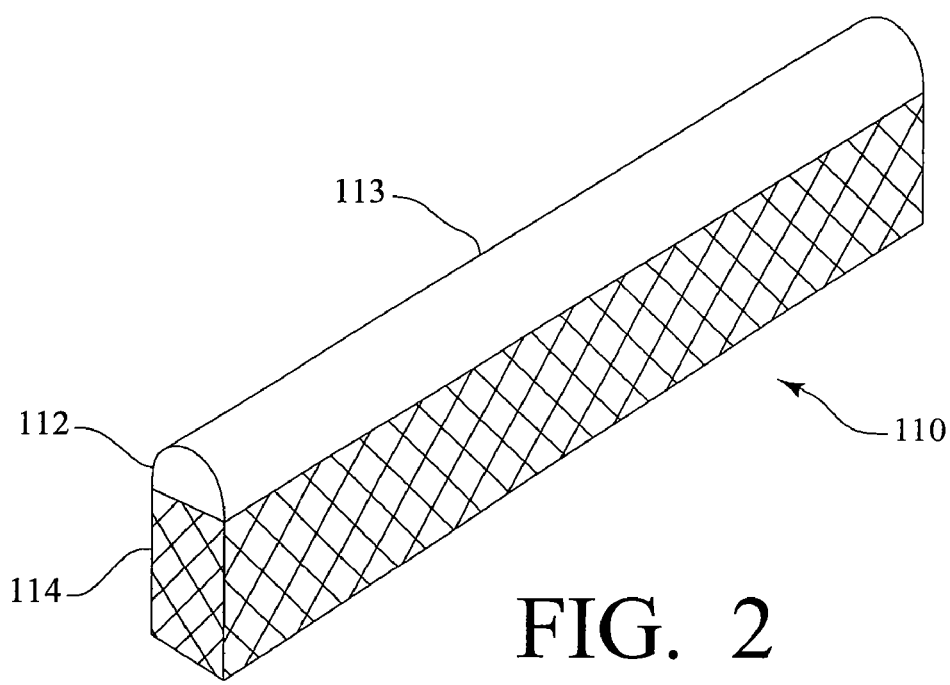
FIG. 2 is a perspective view of an exemplary illumination device made in accordance with the present invention.

The present invention is an illumination device that includes a means for increasing the visibility of light emitted from the device in daylight conditions.

FIGS. 1a and 1b are block diagrams that generally illustrate the function of an illumination device made in accordance with the present invention. As illustrated in FIGS. 1a and 1b, a light-diffusing member 12 is provided with fluorescent and/or phosphorescent dyes (generally indicated by reference numeral 11). Such dyes 11 could be mixed in and encapsulated in the material that comprises the light-diffusing member 12, or the dyes 11 could be incorporated into a paint or similar coating applied to one or more surfaces of the light-diffusing member 12. With respect to the use of such fluorescent and/or phosphorescent dyes 11, fluorescence is the emission of certain electromagnetic radiation (i.e., light) from a body that results from the incidence of electromagnetic radiation on that body. In other words, if light energy is directed into a fluorescent body, that body absorbs some of the energy and then emits light of a lesser energy; for example, blue light that is directed into a fluorescent body may emit a lower-energy green light. In phosphorescence, the body similarly absorbs some of the light energy, and then emits light of a lesser energy. However, unlike fluorescent bodies, which generally emit the lower energy light in picoseconds, phosphorescent bodies absorb and emit light at a much slower rate. Accordingly, the dyes 11 used in the present invention are most appropriately defined as a material that absorbs light at certain wavelengths and then emits light of a lesser energy at longer wavelengths.

A light source 24, such as a plurality of light-emitting diodes spaced a predetermined distance from one another, emits light into the light-diffusing member 12. The dye (or combination of dyes) 11 is selected based on its emission profile (i.e., color of light emitted from the dyes) and also so that light from the light source 24 is largely unabsorbed by the dye 11 and passes through the light-diffusing member 12, as illustrated in FIG. 1a. Alternatively, assuming that the dye 11 has been selected for a particular application, a light source 24 is chosen based on its color (wavelength) and such that its emitted light will be largely unabsorbed by the dye and pass through the light-diffusing member 12.

Although light from the light source 24 will be largely unabsorbed by the dye 11 and pass through the light-diffusing member 12, when sunlight strikes the light-diffusing member 12, as illustrated in FIG. 1b, there will be significant interaction with and activation of the dye 11 as sunlight is absorbed by the dye 11. Accordingly, during daylight conditions, the light source 24 emits light through the light-diffusing member 12, while at the same time, sunlight activates the dyes 11 of the light-diffusing member 12 to cause them to emit additional light, as illustrated in FIG. 1b.

Figure 3:
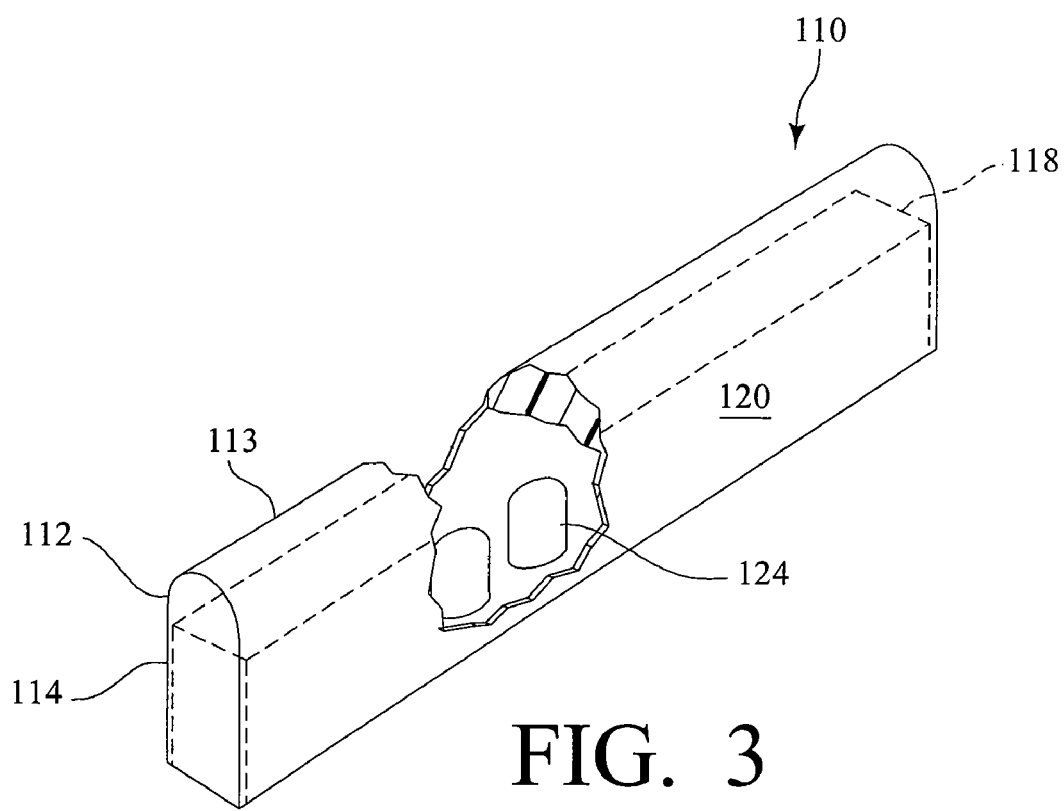
FIG. 3 is a perspective view similar to that of FIG. 2, but with a portion of the exemplary illumination device broken away to show the interior of the device.
Figure 4:
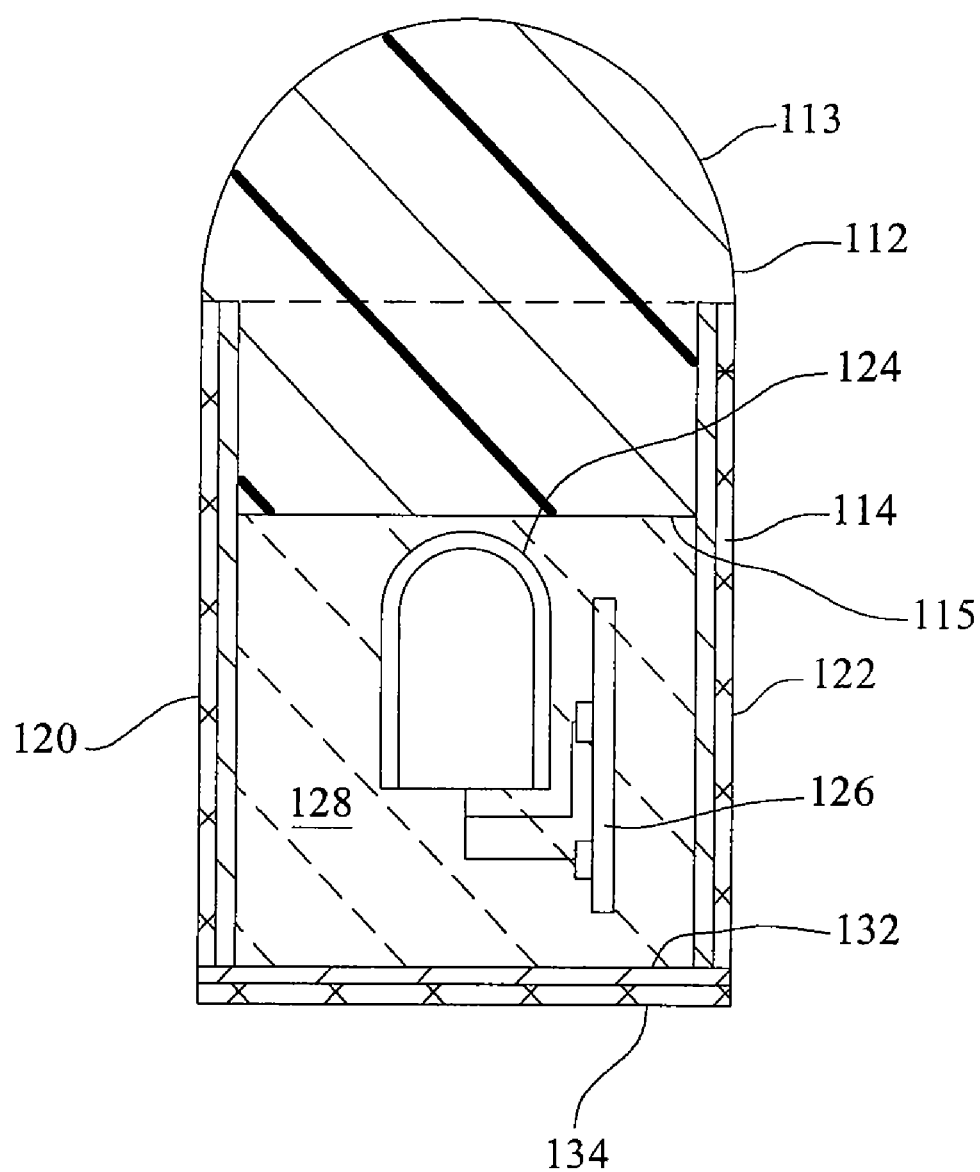
FIG. 4 is an end view of the exemplary illumination device of FIG. 2.

For further explanation, FIGS. 2–4 illustrate an exemplary illumination device 110 made in accordance with the present invention that has a structure and construction similar to that described in U.S. Pat. Nos. 6,592,238 and 6,953,262. As illustrated in FIGS. 2–4, the illumination device 110 generally comprises a light-diffusing member 112, a housing 114, and a light source 124. In this exemplary embodiment and as described in U.S. Pat. Nos. 6,592,238 and 6,953,26, the light-diffusing member 112 is a rod-like member that can be characterized as a "leaky" waveguide as it functions both as an optical waveguide and light scattering member. This waveguide 112 has a curved surface 113 serving as the light-emitting surface of the waveguide 112 and an internal surface 115 (as best illustrated in FIG. 4) that serves as the light-receiving surface. Although such a geometry is desirable because it simulates a neon tube, the waveguide 112 of the present invention can be also be produced in various other shapes without departing from the spirit and scope of the present invention. Furthermore, other light-diffusing or light-scattering members could be incorporated into the illumination device in place of the waveguide 112 without departing from the spirit and scope of the present invention. In any event, light entering the waveguide 112 of the illumination device 110 from the light source 124 and through the light-receiving surface 115 is preferentially scattered so as to exit with a broad elongated light intensity distribution pattern out of the light-emitting surface 113.

Referring still to FIGS. 2–4, one preferred light source 124 is a plurality of light-emitting diodes spaced a predetermined distance from one another. The light source 124 and accompanying electrical accessories, including a circuit board 126, are positioned within the housing 114. In this exemplary embodiment, the housing 114 is positioned below the waveguide 112 such that the light source 124 emits light into the light-receiving surface 115 of the waveguide. The housing 114 generally comprises a pair of side walls 120, 122 defining an open-ended channel 118 that extends substantially the length of waveguide 112. And, in this exemplary embodiment, the housing 114 also includes a floor portion 132, connecting the two side walls 120, 122 so that the housing has a substantially U-shape. The housing 114 preferably not only functions to house the light source 124 and electrical accessories, but also to collect light not emitted directly into the light-receiving surface 115 and redirect it to the waveguide 112. As such, as best illustrated in FIG. 4, the internal surfaces of the side walls 120, 122, and the floor portion 132 may be constructed of or coated with a light-reflecting material (e.g., white paint or tape) in order to increase the light collection efficiency by reflecting the light incident upon the internal surfaces of the housing 114 into the waveguide 112.

As a further refinement, from a viewer's perspective, it is desirable that the visual appearance of the housing 114 not be obtrusive with respect to the glowing, light-emitting surface 113 of the waveguide 112. Therefore, the outside surfaces of the housing 114 may be constructed of or coated with a light absorbing material 134 (e.g., black paint or tape).

As yet a further refinement, in the exemplary embodiment illustrated in FIGS. 2–4, the positioning of the light source 124 and electrical accessories within the channel 118 may be maintained by filling the channel 118 with potting material 128.

As described above with respect to FIGS. 1a and 1b, to increase the visibility of light emitted from this illumination device 110 in daylight conditions, fluorescent and/or phosphorescent dyes are added to the waveguide 112. These dyes can be mixed in and encapsulated in the material that comprises the waveguide 112, or the dyes could be incorporated into a paint or similar coating applied to one or more surfaces of the waveguide 112.

Figure 5:
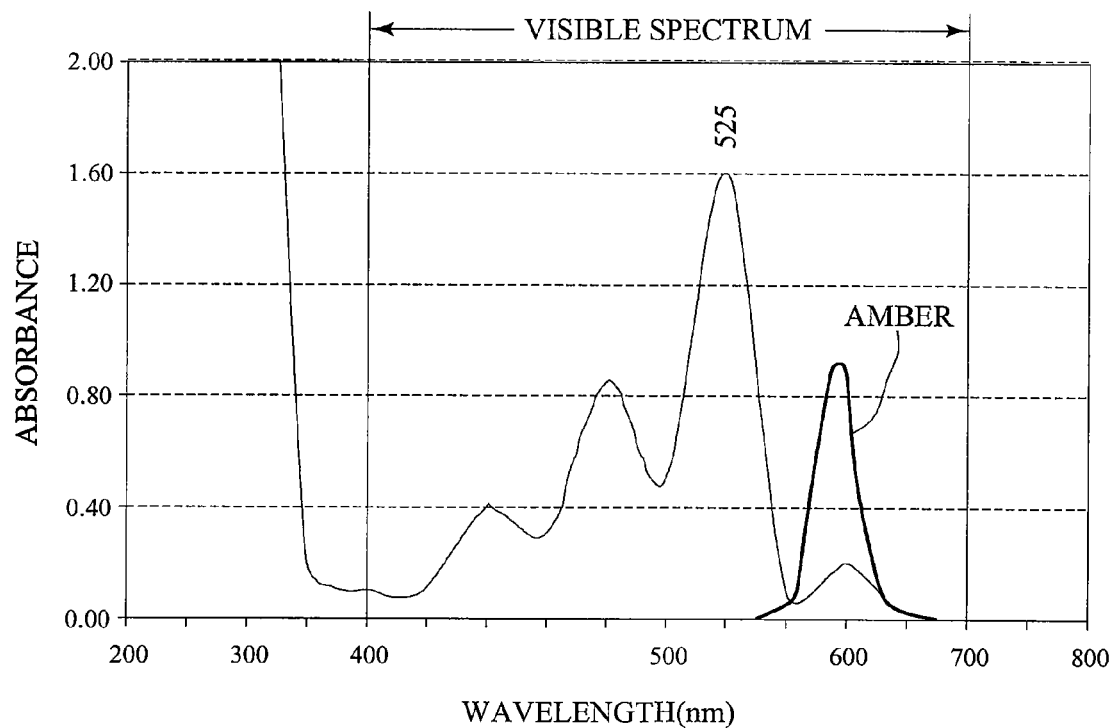
FIG. 5 is a graph of an absorption profile for a particular dye that can be used in the exemplary illumination device of FIG. 1.

The dye (or combination of dyes) is selected so that light emitted from the light source 124 is largely unabsorbed by the dye and passes through the waveguide 112. For example, assume that a LUMOGEN F Orange 240 dye is added to the waveguide 112. (LUMOGEN is a trademark of the BASF Corporation). FIG. 5 is a graph of the absorption profile for this dye, indicating that there is peak absorption in the ultraviolet portion (<400 nm) of the graph, while there is weak absorption in the visible spectrum at wavelengths ≧575 nm. In this case, a series of amber light-emitting diodes is used as the light source 124, which, in this example, emit light at approximately 590 nm. Therefore, light from the light source 124 is largely unabsorbed by the dye and passes through the waveguide 112. However, when sunlight (which includes ultraviolet light and visible light) strikes the waveguide 112 (primarily through the exposed light-emitting surface 113 of the waveguide 112), there is significant interaction with and activation of the dye as sunlight is absorbed by the dye, with the dye then emitting light of a lesser energy. In this case, the light emitted from the dye has a wavelength of approximately 590 nm, closely matching that of the light emitted from the light source 12.4.

Accordingly, during daylight conditions, the light source 124 generates and emits light through the waveguide 112, while at the same time, sunlight activates the dyes of the waveguide 112 to cause them to emit additional light. In other words, what is perceived along the light-emitting surface 113 of the waveguide is a combination of the light from the light source 124 and light from the dye (as activated by sunlight), thus increasing the output of the illumination device 110 in daylight conditions. On the other hand, when there is no sunlight, there is no need for the additional output, and since there is minimal or no interaction between the light source 124 and the dyes, color integrity is maintained.

One of ordinary skill in the art will also recognize that additional embodiments are possible without departing from the teachings of the present invention or the scope of the claims which follow. This detailed description, and particularly the specific details of the exemplary embodiments disclosed herein, is given primarily for clarity of understanding, and no unnecessary limitations are to be understood therefrom, for modifications will become obvious to those skilled in the art upon reading this disclosure and may be made without departing from the spirit or scope of the claimed invention.

What is claimed is:

1. An illumination device for use in daylight conditions, comprising:
   a light-diffusing member having a light-receiving surface and a light-emitting surface, said light-diffusing member including one or more dyes; and
   a light source extending along and positioned adjacent said light-receiving surface, said light source emitting light that is substantially unabsorbed by the dyes as it passes through the light-diffusing member;
   wherein, in daylight conditions, said dyes are activated by sunlight to emit light such that light perceived along the light-emitting surface of said light-diffusing member is a combination of light from said light source and light from the dyes, thus increasing the output of the illumination device in daylight conditions.

2. The illumination device as recited in claim 1, wherein said dyes are one or more fluorescent dyes.

3. The illumination device as recited in claim 1, wherein said dyes are one or more phosphorescent dyes.

4. The illumination device as recited in claim 1, wherein said dyes are a combination of fluorescent and/or phosphorescent dyes.

5. The illumination device as recited in claim 1, wherein said dyes are mixed in and encapsulated in said light-diffusing member.

6. The illumination device as recited in claim 1, wherein said dyes are incorporated into a coating applied to one or more surfaces of said light-diffusing member.

7. The illumination device as recited in claim 1, wherein said light source is a plurality of light-emitting diodes.

8. The illumination device as recited in claim 1, wherein said light-diffusing member is a substantially rod-like member having a predetermined length, said rod-like member being comprised of a material that preferentially scatters light entering said light-receiving surface such that a light intensity pattern exiting said light-emitting surface is elongated and substantially uniform along the length of said rod-like member.

9. The illumination device as recited in claim 8, and further comprising a housing extending substantially the length of said rod-like member and housing said light source.

10. The illumination device as recited in claim 9, wherein said housing generally comprises a pair of side walls that define an open-ended channel, said light source being received and housed in said open-ended channel.

11. The illumination device as recited in claim 9, and further comprising one or more light collection surfaces provided on internal surfaces of said housing, said light collection surfaces collecting and reflecting light into the light-receiving surface of said light-diffusing member.

12. The illumination device as recited in claim 10, and further comprising one or more collection surfaces provided on internal surfaces of said side walls, said light collection surfaces collecting and reflecting light into the light-receiving surface of said light-diffusing member.

13. An illumination device for use in daylight conditions, comprising:
   a light source emitting light of a predetermined wavelength; and
   a light-diffusing member receiving light emitted from the light source through a light-receiving surface thereof, said light-diffusing member including one or more dyes with minimal absorption at the predetermined wavelength such that light emitted from said light source is substantially unabsorbed by the dyes as it passes through the light-diffusing member;
   wherein, in daylight conditions, said dyes are activated by sunlight to emit light such that light perceived along a light-emitting surface of said light-diffusing member is a combination of light from said light source and light from the dyes, thus increasing the output of the illumination device in daylight conditions.

14. The illumination device as recited in claim 13, wherein said dyes are one or more fluorescent dyes.

15. The illumination device as recited in claim 13, wherein said dyes are one or more phosphorescent dyes.

16. The illumination device as recited in claim 13, wherein said dyes are a combination of fluorescent and/or phosphorescent dyes.

17. The illumination device as recited in claim 13, wherein said dyes are mixed in and encapsulated in said light-diffusing member.

18. The illumination device as recited in claim 13, wherein said dyes are incorporated into a coating applied to one or more surfaces of said light-diffusing member.

19. The illumination device as recited in claim 13, wherein said light source is a plurality of light-emitting diodes.

20. The illumination device as recited in claim 13, wherein said light-diffusing member is a substantially rod-like member having a predetermined length, said rod-like member being comprised of a material that preferentially scatters light entering said light-receiving surface such that a light intensity pattern exiting said light-emitting surface is elongated and substantially uniform along the length of said rod-like member.

21. The illumination device as recited in claim 20, and further comprising a housing extending substantially the length of said rod-like member and housing said light source.

22. An illumination device for use in daylight conditions, comprising:
    a light source emitting light of a predetermined wavelength; and
    a light-diffusing member receiving light emitted from the light source through a light-receiving surface thereof, said light-diffusing member including a means for absorbing light at certain wavelengths, but not at the predetermined wavelength of said light source, and then emitting light at certain longer wavelengths;
    wherein, in daylight conditions, said means for absorbing light is activated by sunlight to absorb light at said certain wavelengths and then emit light at said certain longer wavelengths, such that light perceived along a light-emitting surface of said light-diffusing member is a combination of light from said light source and light from said means for absorbing light, thus increasing the output of the illumination device in daylight conditions.

* * * * *